US008165701B2

(12) United States Patent
Aiso et al.

(10) Patent No.: US 8,165,701 B2
(45) Date of Patent: Apr. 24, 2012

(54) AUDIO DEVICE (75) Inventors: Masaru Aiso, Hamamatsu (JP); Takamitsu Aoki, Hamamatsu (JP)

(73) Assignee: Yamaha Corporation (JP)

( * ) Notice: Subject to any disclaimer, the term of this patent is extended or adjusted under 35 U.S.C. 154(b) by 1083 days.

(21) Appl. No.: 12/043,108

(22) Filed: Mar. 5, 2008

(65) Prior Publication Data
US 2008/0219477 A1 Sep. 11, 2008

(30) Foreign Application Priority Data

Mar. 7, 2007 (JP) ................. 2007-056703

(51) Int. Cl.
*G06F 17/00* (2006.01)
*G06F 15/173* (2006.01)
*G06F 15/16* (2006.01)
*G06F 3/00* (2006.01)
*G06F 3/16* (2006.01)
*H04L 12/28* (2006.01)
*H04L 12/66* (2006.01)
*H04L 12/50* (2006.01)
*G09F 27/00* (2006.01)

(52) U.S. Cl. .......... 700/94; 715/700; 715/727; 370/419; 370/420; 370/421; 370/386; 370/463; 709/228; 709/224; 709/823; 381/124

(58) Field of Classification Search .................. 381/119; 700/94; 710/1; 370/419–421, 252, 386; 370/463; 717/104–105, 113; 709/228, 224, 709/200

See application file for complete search history.

(56) References Cited

U.S. PATENT DOCUMENTS

| 2002/0193894 A1 | 12/2002 | Terada et al. |
| 2005/0038922 A1 | 2/2005 | Yamamoto et al. |
| 2007/0043462 A1 | 2/2007 | Terada et al. |

FOREIGN PATENT DOCUMENTS

| JP | 2002-374587 A | | 12/2002 |
| JP | 2005-064880 A | | 3/2005 |
| JP | 2005064880 A | * | 3/2005 |
| JP | 2006-217089 A | | 8/2006 |
| JP | 2006217089 A | * | 8/2006 |

OTHER PUBLICATIONS

Office Action issued in corresponding Japanese Application No. 2007-056703 dated Feb. 17, 2009, with English translation.

* cited by examiner

*Primary Examiner* — Devona Faulk (74) *Attorney, Agent, or Firm* — Rossi, Kimms & McDowell LLP (57) ABSTRACT

In an audio device that has a port for connection and that constitutes an audio system together with at least one external device having a port for connection with the audio device via a communication line, a plurality of connection setting templates are previously prepared, which contain target port connection information specifying target destination ports to which the ports of the audio device and the external device that constitute the audio system should be connected. One of the connection setting templates is selected. Check is made to compare the target port connection information contained in the selected connection setting template with actual port connection information indicating actual destination ports to which respective ports of the audio device and the external device constituting the audio system are actually connected.

4 Claims, 10 Drawing Sheets

−Connection List−  −Unit List−  −Port Setting List−

| Connection #1 |
|---|
| Connection #2 |
| ... |

| PM5D #1 |
|---|
| DSP5D #2 |

| Port | Destination | |
|---|---|---|
| | Unit | Port |
| Cascade Out | DSP5D #2 | Cascade In |
| Cascade In | DSP5D #2 | Cascade Out |

| Port | Destination | |
|---|---|---|
| | Unit | Port |
| Cascade Out | PM5D #1 | Cascade In |
| Cascade In | PM5D #1 | Cascade Out |
| EtherSound Out | Ext.Device | − |
| EtherSound In | N/A | N/A |

| PM5D #1 |
|---|
| DCU5D |
| DSP5D #2 |

| Port | Destination | |
|---|---|---|
| | Unit | Port |
| Cascade Out | DCU5D | Cascade In |
| Cascade In | DCU5D | Cascade Out |

| Port | Destination | |
|---|---|---|
| | Unit | Port |
| Cascade Out | PM5D #1 | Cascade In |
| Cascade In | PM5D #1 | Cascade Out |
| EtherSound Out | DSP5D #2 | Ethersound In |
| EtherSound In | N/A | N/A |

| Port | Destination | |
|---|---|---|
| | Unit | Port |
| Cascade Out | Ext. Device | − |
| Cascade In | Ext. Device | − |
| EtherSound Out | N/A | N/A |
| EtherSound In | DCU5D | Ethersound Out |

AUDIO DEVICE

This application is based on, and claims priority to, Japanese Patent Application No: 2007-056703, filed on Mar. 7, 2007. The disclosure of the priority application, in its entirety, including the drawings, claims, and the specification thereof, is incorporated herein by reference.

BACKGROUND OF THE INVENTION

1. Technical Field

The present invention relates to an audio device constituting an audio system, together with at least one external device connected to the audio device via a communication line.

2. Related Art

Conventionally, there is known a mixing console, which is used in a concert hall or the like, for regulating the levels of audio signals and frequency responses output from a lot of microphones or electric or electronic musical instruments, mixing them into some mixing groups, and transmitting the mixing groups to a power amplifier. As an example, reference is herein made to Japanese Patent Application Laid-Open No. 2002-374587. As this type of mixing console, there is known a mixing console including a console unit and an engine unit connected to the console unit via a communication line. In this type of mixing console, generally the console unit is installed between seats distant from the stage or installed in a console room, which is located rearward of the seats, and the engine unit connected to the console unit is installed in the vicinity of the stage. An operator who operates the mixing console regulates the volume and tones of audio signals of instrument sounds or singing voice to a condition that the performance is expressed most appropriately with a mixing operation while checking the sounds heard by the audience by operating various panel controls provided in the console unit. The engine unit has a function of mixing the audio signals and is connected to a plurality of input units and output units which are analog and digital input units and analog and digital output units via communication lines. Additionally, the engine unit includes a plurality of input channels for assigning a plurality of microphone and line inputs entered from the input units, and it mixes the audio signals from the input channels according to control signals from the console unit and outputs them to a plurality of output channels. The outputs from the output channels are supplied to the output units and the sounds are emitted from a speaker connected to the output units.

In the case where the mixing console is brought into and installed in a concert hall, the time allowed for the installation work is often extremely short and it is therefore necessary to perform various installation operations rapidly. Furthermore, the console unit and the engine unit are generally connected in cascade connection, but the distance between the console unit and the engine unit cannot be long in cascade connection, and it is often necessary to connect them via Ethernet to make the distance long instead of the regular cascade connection. Consequently, it is suggested that a long distance connection is achieved between the console unit and the engine unit by providing a cabling unit, which performs a conversion between the cascade and Ethernet, between the console unit and the engine unit. Furthermore, the engine unit is connected to a plurality of input units and output units. In this manner, a worker needs to connect the console unit, the engine unit, the cabling unit, and the plurality of input units and output units while checking the connections therebetween in the conventional installation work of the mixing console. It, however, has been a time-consuming and complicated work to check correctness of the connections among ports of the units, because both of the cascade transmission line and the Ethernet transmission line have a considerable length. Therefore, it has been difficult to reduce the installation work time. Moreover, the input units and the output units each have a structure in which an audio plug-in card is installed in each unit, and therefore the worker needs to insert the audio plug-in card into each slot of the plurality of input units and output units while checking the audio plug-in card, which leads to a further increase in the installation work time.

In order to solve the above problem, conventionally an application program is executed on a computer before installing the mixing console to preset a connection method between devices or units necessary for the mixing console and to specify which audio plug-in card should be inserted into which slot of each unit. Thereafter, at the start of the installation work, the console unit is connected to the engine unit and they are turned on, and then the preset setting information is loaded from the computer to the console unit. Thereafter, various units are connected to the engine unit. During the connection, actual connection information is compared with the loaded setting information: if an incorrect unit is connected, a warning signal indicating as such is output. The same is true in the case of subsequently inserting an audio plug-in card into various units: if an incorrect audio plug-in card is inserted into the slot of one of the various units, a warning signal indicating as such is output. This reduces the installation work time of the mixing console.

Conventionally, a user has made the data of all components of the mixing console in advance for the installation assist program. Consequently, the user needs to specify the settings of the positions of the slots into which the audio plug-in cards are inserted, which leads to a problem that the data generation itself becomes complicated and thus it takes a log time to generate the data. Additionally, even if the user wants to check only the connection of required devices while skipping the detailed settings temporarily, the user needs to generate the data of all components and therefore cannot easily use the mixing console.

SUMMARY OF THE INVENTION

Therefore, it is an object of the present invention to provide an audio device capable of checking only the connection status between required devices without needs for preparing the data of all components of an audio system, at the start of an installation work of the audio system.

To achieve the above object, the audio device of the present invention has a port for connection and constitutes an audio system together with at least one external device having a port for connection with the audio device via a communication line. The inventive audio device comprises: a plurality of connection setting templates that are previously prepared and that contain target port connection information specifying target destination ports to which the ports of the audio device and the external device that constitute the audio system should be connected; a selection part that selects one of the connection setting templates; a check part that compares the target port connection information contained in the connection setting template selected by the selection part with actual port connection information indicating actual destination ports to which respective ports of the audio device and the external device constituting the audio system are actually connected; and an output part which outputs a result of comparison between the target port connection information and the actual port connection information by the check part.

Preferably, the audio device further comprises a display part that displays a connection diagram showing a connection topology of the audio device and the external device of the audio system constituted based on the connection setting template selected by the selection part, wherein the connection diagram shows communication lines that connect the ports of the audio device and the external device to the target destination ports for transmission of audio data and information indicating one or more devices used to process the audio data transmitted via the communication lines.

Preferably, the audio device and the external device have the ports of various types, and the display part indicates the ports in the form of icons corresponding to the types of the ports in the connection diagram.

Preferably, the check part transmits the target port connection information to the external device, and receives a result of comparison performed by the external device between the actual port connection information indicating the actual destination ports to which the ports of the external device are actually connected and the received target port connection information.

In case that the received result of the comparison indicates an error at a point where the actual port connection information does not match the target port connection information, the output part controls the display part to indicate that there is a connection error in the connection diagram at the point where the error is indicated.

According to the present invention, the port connection information contained in the connection setting template selected out of a plurality of types of connection setting template prepared in advance is compared with the port information on the destination ports, to which respective ports of the audio device and the external device constituting the audio system are actually connected, and the comparison result is output, whereby one of the connection setting template can be selected instead of making the detailed setting data of the configuration of the audio system. Moreover, since the compared information includes only the target port connection information and the actual port connection information on the destination ports, to which the respective ports of the audio device and the external device constituting the audio system are actually connected, a user can check only the connection states between required devices.

DETAILED DESCRIPTION OF THE INVENTION

Figure 1:
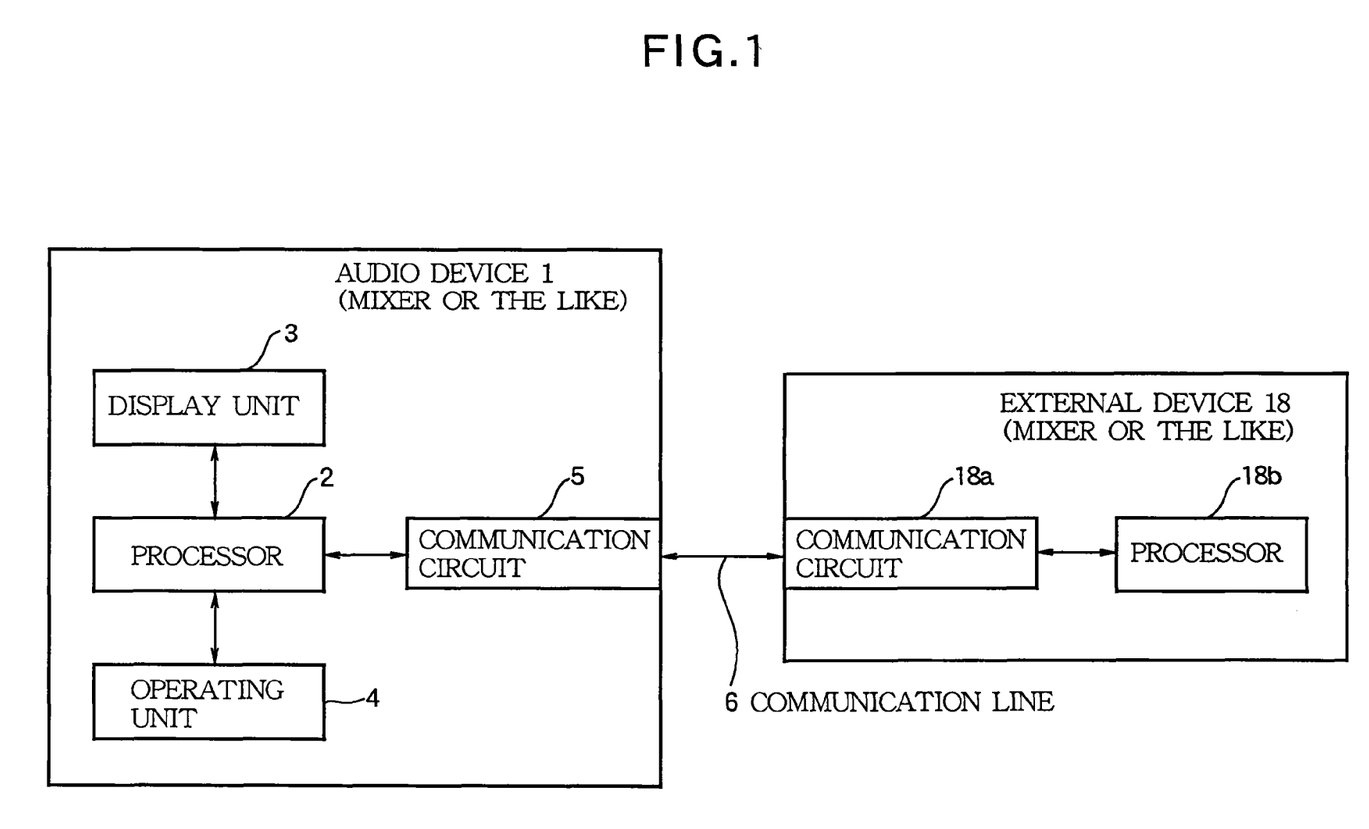
FIG. 1 is a block diagram illustrating a schematic configuration of an audio system including an audio device according to an embodiment of the present invention.

Referring to FIG. 1, there is shown a block diagram illustrating a schematic configuration of an audio system including an audio device according to an embodiment of the present invention.

The audio system shown in FIG. 1 includes an audio device 1 considered to be a master in the audio system and an external device 18 such as a mixer considered to be a slave connected to the audio device 1 via a communication line 6. In this case, another external device can be further connected to the external device 18 via a communication line. The audio device 1 includes at least a console unit in the case where the audio system is a mixing console and thus it can include a signal processing unit which performs a mixing process. The external device 18 is an engine unit which mixes audio signals according to a control signal from the console unit when the audio system is a mixing console. The audio device 1 includes a processor 2 having a central processing unit (CPU) and a digital signal processor (DSP), an operating unit 4 and a display unit 3 used when a user operates a console or the like, and a communication circuit 5 for connecting to the communication line 6. The external device 18 includes a processor 18b having a DSP and a communication circuit 18a for connecting to the communication line 6. The DSPs in the processors 2 and 18b are for use in processing audio signals of a plurality of channels and perform signal processing by mixing the signals according to a control signal from the console unit and outputting the mixed signals to a plurality of output channels.

Figure 2:
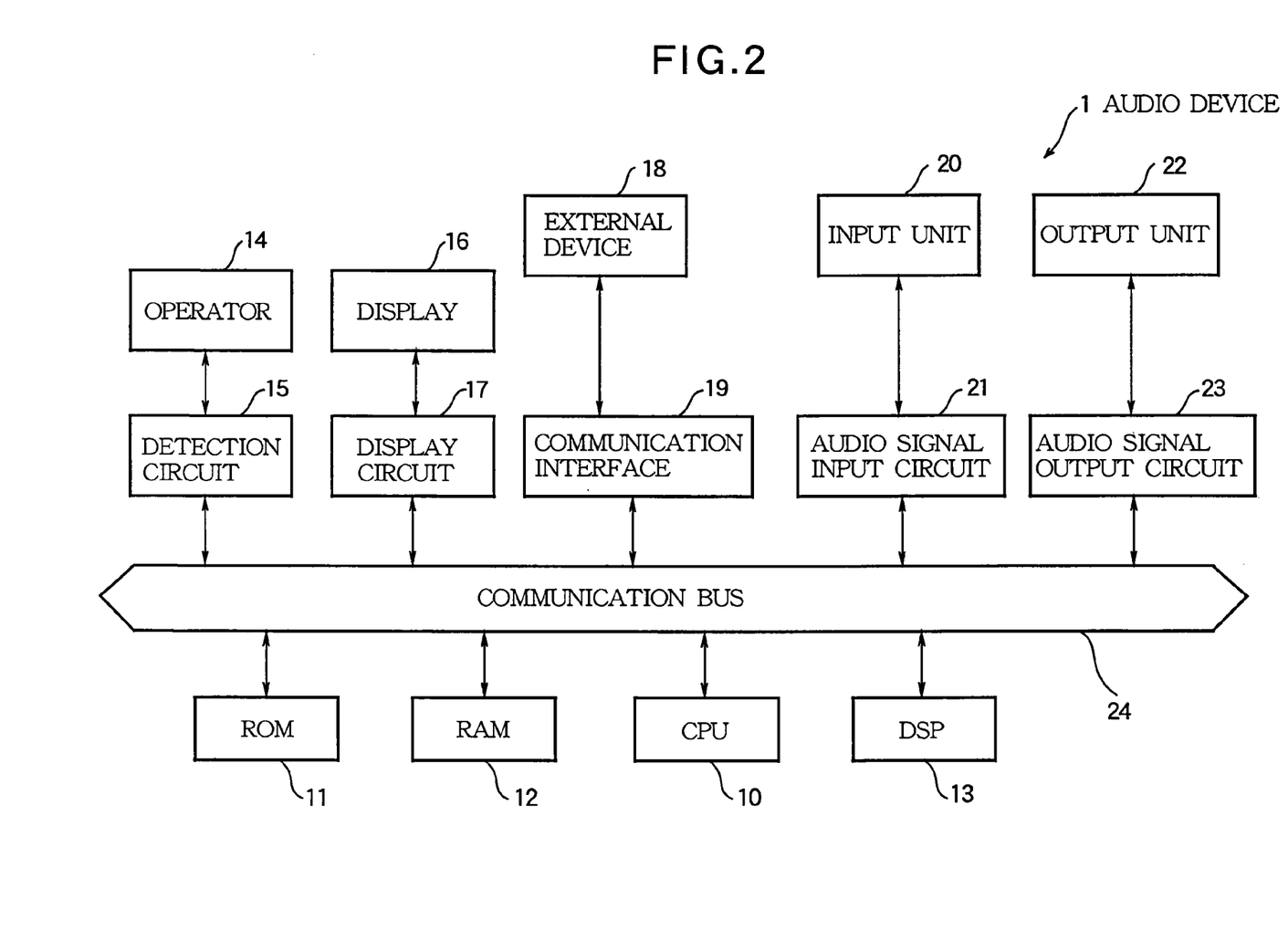
FIG. 2 is a block diagram illustrating a detailed configuration of the audio device according to the embodiment of the present invention.

Subsequently, FIG. 2 shows a block diagram illustrating a detailed configuration of the audio device 1 according to the present invention.

In FIG. 2, the central processing unit (CPU) 10 controls the entire operation of the audio device 1 and executes operating software such as a drawing program, which displays an operation screen or a screen for selecting a connection template described later on a display 16, and a control program. A read only memory (ROM) 11 stores the connection template or other data and the operating software such as the drawing program and control program executed by the CPU 10, and a random access memory (RAM) 12 contains work areas for the CPU 10 and storage areas of various data set therein. By using a rewritable ROM such as a flash memory as the ROM 11, the operating software becomes rewritable, by which the user can easily add or rewrite a connection template and upgrade the operating software. A DSP 13 is a signal processing unit which processes audio signals of the plurality of channels as described above.

A detection circuit 15 detects an event of an operator 14 by scanning panel operators or other operators 14 and outputs an event output corresponding to the operator 14 where the event occurs. The operator 14 includes a lot of operators for operating an equalizing characteristic or pan characteristic of each channel or for switching scenes. A display circuit 17 includes the display 16 such as a liquid crystal display (LCD) and the display 16 shows an operation screen on which various settings can be made when operating parameters of each channel. In addition, it shows a connection diagram of a connection template selected at the installation of the audio system. Regarding various settings, the user can make settings on the operation screen using graphical user interface (GUI). A communication interface (I/F) 19 is an interface connecting the external device 18 via the cascade connection or Ethernet, and the audio device 1 is logically connected to the external device 18 via the interface. An audio signal input circuit 21 takes an audio signal from an input unit 20 such as a microphone for recording an external sound into the audio device 1, and an audio signal output circuit 23 outputs an audio signal subjected to signal processing such as mixing process, which is output from the audio device 1, to an output unit 22 such as an external speaker to output a sound. The input unit 20 can be an input unit for entering an audio signal of microphone/line and the output unit 22 can be an output unit for outputting a sound from the speaker. These units are connected to a communication bus 24 to transmit or receive data via the communication bus 24.

Note here that the "connection template" shows wire connections between devices in the audio system. A plurality of connection templates in the audio system supposed to be frequently used are prepared in advance and are stored in the ROM 11. The user selects one of the plurality of connection templates on a connection template selection screen displayed on the display 16. This causes the connection diagram of the selected connection template to be displayed on the display 16. In the connection diagram, a frame is displayed for each of the audio device 1 and the required number of external devices 18, which constitute the audio system, with icons of connection ports of each device displayed within the frame of the corresponding device. As the icons of the connection ports, an icon for the cascade connection and an icon for Ethernet are prepared, and a connection path between the devices is shown by connecting the connection ports. Which device processed the signal is shown around the path connecting the connection ports. Then, upon power-on in the installation work of the audio device 1 and the required number of external devices 18, the connection status between the actually connected devices is compared with the selected connection template to check that the actual connection matches the connection template and a result of the check is displayed on the display 16.

The types of connection ports of each device include cascade connection ports and Ethernet ports, and the ports are connected to each other via a cable depending on the type of the connection port. Moreover, while the connection check between the devices is performed by the active sense or port ID discrimination, the check target is "a device connection status" between the audio device 1 and the external device 18 constituting the audio system. On the other hand, the connection check is not performed for the connection status of a slot, into which a plug-in card is inserted where the plug-in card is to be installed in each of various units connected as the external devices 18. From the above considerations, the connection template can be defined as a specification of "the device connection status" between the audio device 1 and the external device 18 constituting the audio system to be checked. Since the connection information on the connection template supposed to be frequently used is compared with the actual connection information between the devices in the connection check, the connection check between a plurality of devices constituting an audio system such as a mixing console can be easily performed in the case where the audio system is brought into and installed in a concert hall. Moreover, the connection check between the devices is only required, which eliminates the need for previously saving the detailed settings of the devices in the connection template.

Figure 3:
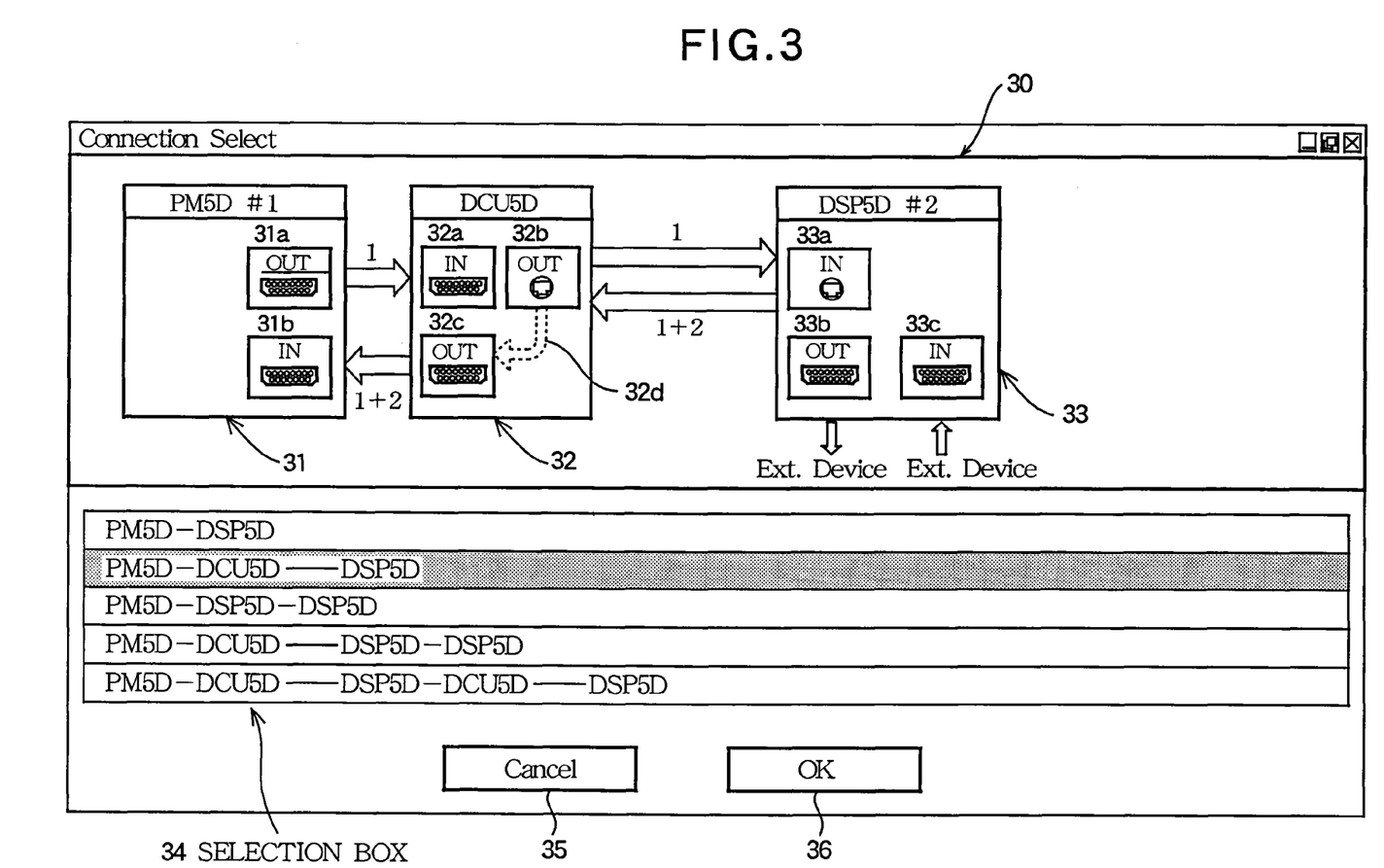
FIG. 3 is a diagram illustrating an example of a connection template selection screen displayed on a display unit in the audio device according to the embodiment of the present invention.

Subsequently, FIG. 3 illustrates an example of the connection template selection screen displayed on the display 16.

A selection box 34 of a connection template is displayed in the lower part of the connection template selection screen (Connection Select) shown in FIG. 3 with a Cancel button 35 and an OK button 36 displayed under the selection box 34, and a connection diagram 30 of the connection template selected in the selection box 34 is displayed in the upper part of the Connection Select screen. The selection box 34 shows a list including, for example, five types of previously prepared connection templates supposed to be frequently used, and the connection template name is indicated by the names of devices to be used and the types (the cascade connection and Ethernet) of channels connecting the devices. In this case, the cascade connection in which the transmission distance cannot be long is indicated by "-" and Ethernet in which the transmission distance can be long is indicated by "-------." In FIG. 3, the connection template named "PM5D-DCU5D-------DSP50" is selected and the connection diagram 30, which appears when the OK button 36 is pressed, is displayed in the upper part of the Connection Select screen.

The name "PM5D" in the selected connection template name indicates a mixing console with the DSP 13, which includes the processing unit for performing a mixing process and the console unit for controlling the mixing process. The name "DCU5D" indicates a cabling unit, which performs a conversion between a signal in cascade connection and a signal in Ethernet, and it can be located distant from the subsequent device. The name "DSP5D" indicates an extended processing unit which performs the mixing process, and the mixing process is controlled by the mixing console connected to the DSP5D via a channel. The audio system defined by the connection template has a structure in which the mixing console (PM5D) is connected to the cabling unit (DCU5D) in cascade connection and the cabling unit (DCU5D) is connected to the processing unit (DSP5D) via Ethernet. Regarding the transmission direction, one-way transmission is employed for the cascade connection and two-way transmission is employed for Ethernet.

The connection diagram 30 of the selected connection template shows the connection mode of the devices constituting the audio system: the mixing console (PM5D #1) 31 corresponding to the audio device 1 includes an output port 31a and an input port 31b in the cascade connection, though not including any Ethernet port. A D-sub 68-pin terminal is used for the cascade connection and the terminal is iconified and the icon indicates a cascade connection port. A cabling unit (DCU5D) 32 which is the external device 18 includes an input port 32a and an output port 32c for the cascade connection and an Ethernet port 32b. An RJ45 terminal is used for Ethernet and the terminal is iconified and the icon indicates an Ethernet port. Furthermore, a processing unit (DSP5D #2) 33 which is the external device 18 for expanding the number of processing channels of audio signals includes an Ethernet port 33a, a cascade connection output port 33b, and a cascade connection input port 33c. The audio throughput of the processing unit 33 is assumed to be equivalent to that of the mixing console 31.

In the connection diagram 30, the cascade connection output port 31a of the mixing console 31 is connected to the cascade connection input port 32a of the cabling unit 32 and a signal processed by the mixing console 31 is output from the output port 31a and entered into the input port 32a. A numeral "1" which means "#1" is displayed at the connection path which connects the ports together to indicate that the signal processed by the mixing console 31 is transmitted via the connection path. In addition, the cascade connection output port 32c of the cabling unit 32 is connected to the cascade connection input port 31b of the mixing console 31 and "1+2" is displayed at the connection path which connects the ports together to indicate that the signal processed by the mixing console 31 and the processing unit 33 is transmitted via the connection path. Thereby, the mixing console 31 can use the signal processed by the processing unit 33. Moreover, the Ethernet bidirectional port 32b of the cabling unit 32 is connected to the Ethernet bidirectional port 33a of the processing unit 33: "1" is displayed at the downward connection path which connects the ports together to indicate that the signal processed by the mixing console 31 is transmitted via the connection path; and "1+2" is displayed at the upward connection path to indicate that the signal processed by the mixing console 31 and the processing unit 33 is transmitted via the connection path. Thereby, the processing unit 33 can use the signal processed by the mixing console 31.

The signal received at the Ethernet port 32b in the cabling unit 32 is converted to a cascade connection signal and output from the output port 32c. It is indicated by a dashed arrow 32d. Further, the cascade connection output port 33b of the processing unit 33 can be connected to an output unit which is an external device 18 and an audio signal processed by the mixing console 31 and the processing unit 33 can be output from a speaker via the output unit. Moreover, the cascade connection input port 33c of the processing unit 33 can be connected to an input unit which is an external device 18, which allows microphone/line inputs to be entered from the input unit.

Note here that a frame signal composed of, for example, up to 32 channels can be transmitted unidirectionally from a cascade connection port. On the other hand, a frame signal composed of up to 32 channels can be transmitted bidirectionally from an Ethernet port. Moreover, in the case of Ethernet, the specification defines that up to 32 channels can be received (read) from the Ethernet port in a single device and a up to 32 channels can be transmitted (written) from the Ethernet port.

Figure 4:
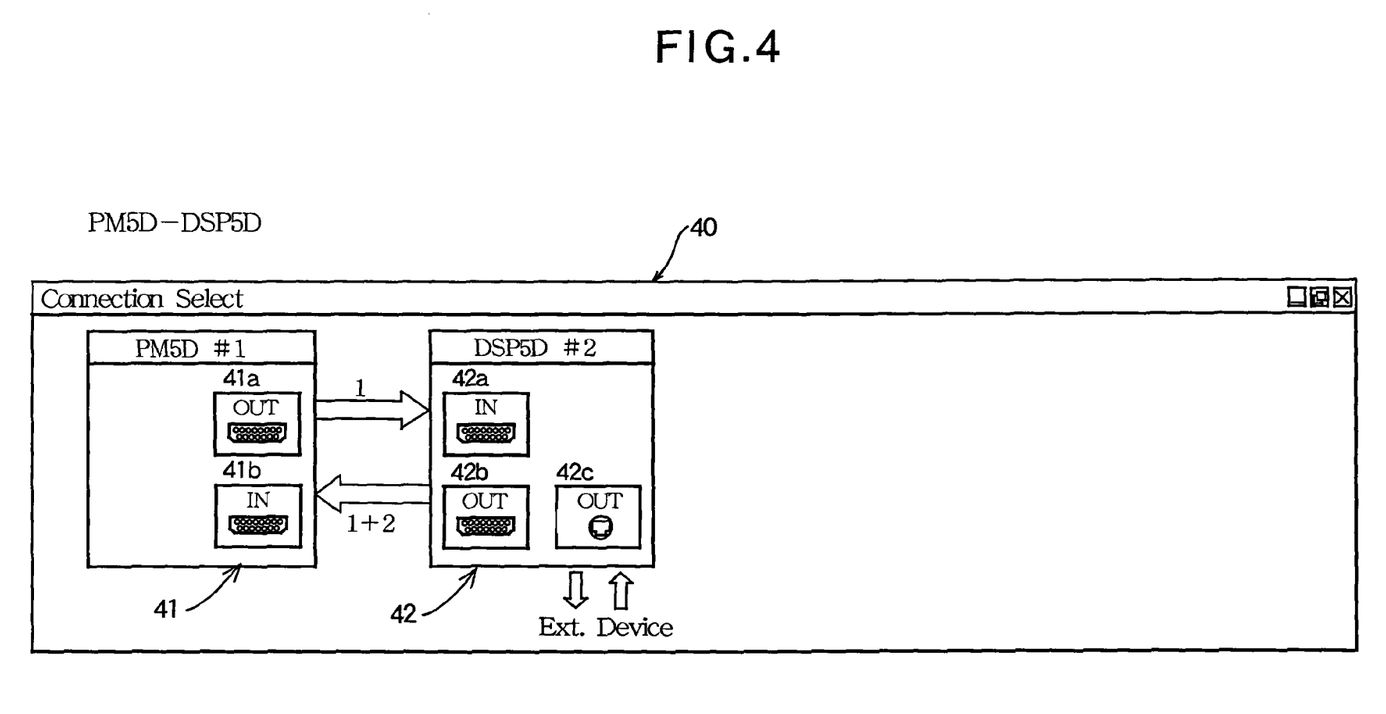
FIG. 4 is a diagram illustrating a connection diagram of a selected connection template displayed on the display unit in the audio device according to the embodiment of the present invention.

Subsequently, FIG. 4 shows a connection diagram 40 which is displayed when the "PM5D-DSP5D" connection template is selected in the selection box 34 on the Connection Select screen and then the OK button 36 is pressed. In the selected connection template, the audio system is composed of a mixing console (PM5D) and an extended processing unit (DSP5D) which performs the mixing process: the mixing console and the processing unit are connected in cascade connection and they are located a short distance away from each other.

In the connection diagram 40, a cascade connection output port 41a of a mixing console (PM5D #1) 41 is connected to a cascade connection input port 42a of a processing unit (DSP5D #2) 42, and "1" is displayed at the connection path to indicate that the signal processed by the mixing console 41 is transmitted via the connection path. In addition, the cascade connection output port 42b of the processing unit 42 is connected to the cascade connection input port 41b of the mixing console 41 and "1+2" is displayed at the connection path to indicate that the signal processed by the mixing console 41 and the processing unit 42 is transmitted via the connection path. Thereby, the mixing console 41 can use the signal processed by the processing unit 42. Moreover, the Ethernet bidirectional port 42c of the processing unit 42 can be connected to an output unit or an input unit which is an external device 18, by which the audio signal processed by the mixing console 41 and the processing unit 42 can be output from a speaker or the like via the output unit and microphone/line inputs can be entered from the input unit.

Figure 5:
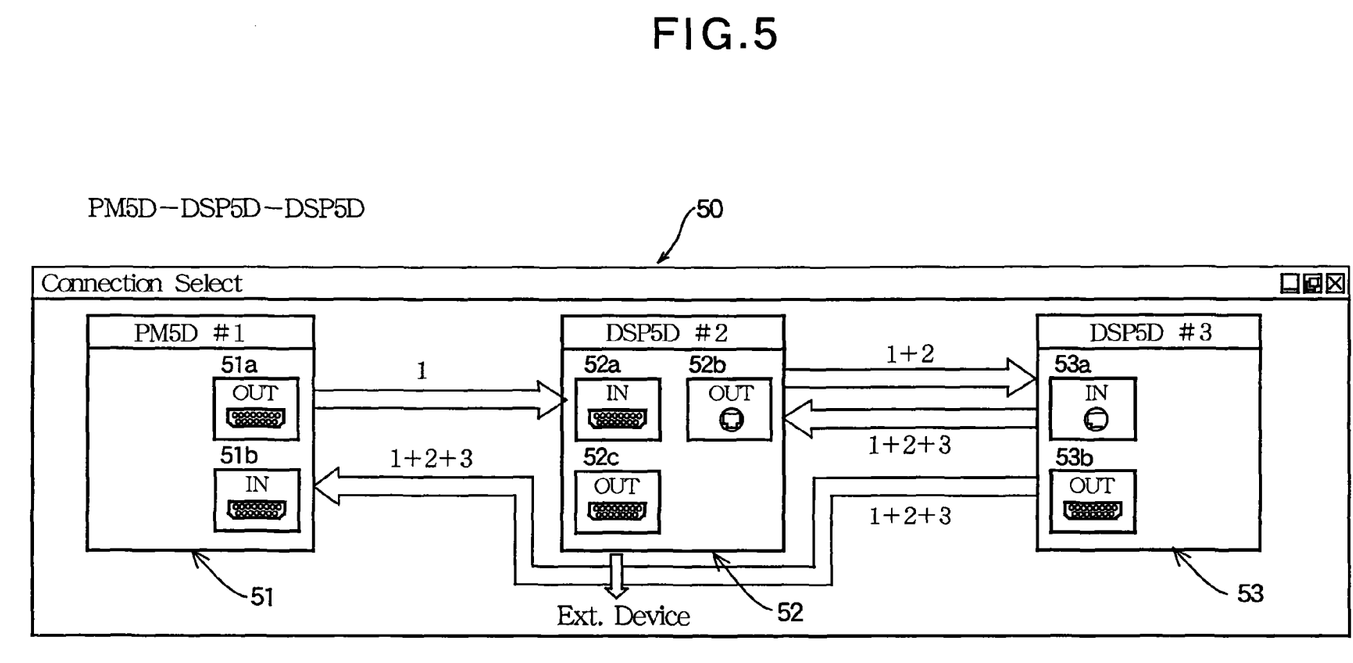
FIG. 5 is a diagram illustrating a connection diagram of another selected connection template displayed on the display unit in the audio device according to the embodiment of the present invention.

Subsequently, FIG. 5 shows a connection diagram 50 which is displayed when the "PM5D-DSP5D-DSP5D" connection template is selected in the selection box 34 on the Connection Select screen and then the OK button 36 is pressed. In the selected connection template, the audio system is composed of a mixing console (PM5D) and two extended processing units (DSP5D) which perform the mixing process: the mixing console is connected to the two processing units in cascade connection with being located a short distance away from each other. Note that, however, the two processing units are connected via Ethernet.

In the connection diagram 50, a cascade connection output port 51a of a mixing console (PM5D #1) 51 is connected to a cascade connection input port 52a of a first processing unit (DSP5D #2) 52, and "1" is displayed at the connection path to indicate that the signal processed by the mixing console 51 is transmitted via the connection path. In addition, the Ethernet bidirectional port 52b of the first processing unit 52 is connected to the Ethernet bidirectional port 53a of the second processing unit (DSP5D #3) 53: "1+2" is displayed at the downward connection path to indicate that the signal processed by the mixing console 51 and the first processing unit 52 is transmitted via the connection path; and "1+2+3" is displayed at the upward connection path to indicate that the signal processed by the mixing console 51, the first processing unit 52, and the second processing unit 53 is transmitted via the connection path. Thereby, the second processing unit 53 can use the signal processed by the mixing console 51 and the first processing unit 52 and the first processing unit 52 can use the signal processed by the mixing console 51 and the second processing unit 53.

Then, a cascade connection output port 53b of the second processing unit 53 is directly connected to a cascade connection input port 51b of the mixing console 51 and "1+2+3" is displayed at the connection path to indicate that the signal processed by the mixing console 51, the first processing unit 52, and the second processing unit 53 is transmitted via the connection path. Thereby, the mixing console 51 can use the audio signal processed by the first processing unit 52 and the second processing unit 53. In addition, an output unit which is an external device 18 can be connected to the cascade connection output port 52c of the first processing unit 52. Then, a speaker or the like can output the audio signal processed by the mixing console 51, the first processing unit 52, and the second processing unit 53 via the output unit.

Although the cascade connection output port 52c of the first processing unit 52 can be connected to the cascade connection input port 51b of the mixing console 51, this connection inhibits the output of the audio signal processed by the mixing console 51, the first processing unit 52, and the second processing unit 53 from the first processing unit 52.

Figure 6:
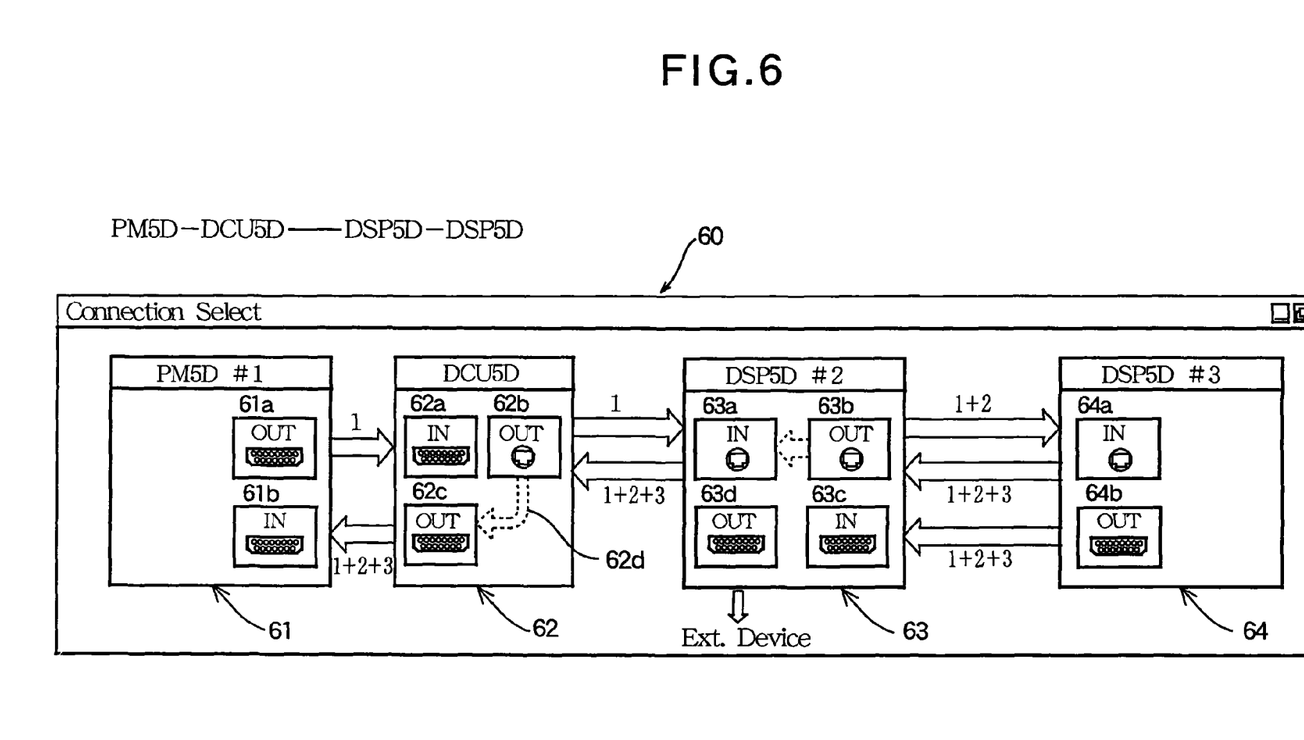
FIG. 6 is a diagram illustrating a connection diagram of still another selected connection template displayed on the display unit in the audio device according to the embodiment of the present invention.

Subsequently, FIG. 6 shows a connection diagram 60 which is displayed when the "PM5D-DCU5D-------DSP5D-DSP5D" connection template is selected in the selection box 34 on the Connection Select screen and then the OK button 36 is pressed. In the selected connection template, the audio system is composed of a mixing console (PM5D), a cabling unit DCU5D, and two extended processing units (DSP5D) which perform the mixing process: the mixing console and the cabling unit are connected in cascade connection, the cabling unit and the first processing unit are connected via Ethernet with being located a long distance away from each other, and the two processing units are connected via Ethernet and in cascade connection with being located a short distance away from each other.

In the connection diagram 60, a cascade connection output port 61a of a mixing console (PM5D #1) 61 is connected to a cascade connection input port 62a of a cabling unit (DCU5D) 62, and a signal processed by the mixing console 61 is output from the output port 61a and entered into the input port 62a. A numeral "1" is displayed at the connection path that connects the ports to indicate that the signal processed by the mixing console 61 is transmitted via the connection path. In addition, a cascade connection output port 62c of the cabling unit 62 is connected to a cascade connection input port 61b of the mixing console 61, and "1+2+3" is displayed at the connection path that connects the ports to indicate that the signal processed by the mixing console 61, the first processing unit (DSP5D #2) 63, and the second processing unit (DSP5D #3) 64 is transmitted via the connection path. Thereby, the mixing console 61 can use the signal processed by the first processing unit 63 and the second processing unit 64. Furthermore, the Ethernet bidirectional port 62b of the cabling unit 62 is connected to the Ethernet bidirectional port 63a of the first processing unit 63: "1" is displayed at the downward connection path that connects the ports to indicate that the signal processed by the mixing console 61 is transmitted via the connection path; and "1+2+3" is displayed at the upward connection path to indicate that the signal processed by the mixing console 61, the first processing unit 63, and the second processing unit 64 is transmitted via the connection path. Note that the signal received by the Ethernet port 62b is converted to a cascade connection signal and output from the output port 62c in the cabling unit 62. It is indicated by a dashed arrow 62d.

Moreover, the Ethernet bidirectional port 63b of the first processing unit 63 is connected to the Ethernet bidirectional port 64a of the second processing unit 64: "1+2" is displayed at the downward connection path to indicate that the signal processed by the mixing console 61 and the first processing unit 63 is transmitted via the connection path; and "1+2+3" is displayed at the upward connection path to indicate that the signal processed by the mixing console 61, the first processing unit 63, and the second processing unit 64 is transmitted via the connection path. Thereby, the second processing unit 64 can use the signal processed by the mixing console 61 and the first processing unit 63. In this regard, however, up to 32 channels can be received (read) via Ethernet in a single device as described above, and therefore in the case where 32 channels are received at the port 63a of the first processing unit 63, the signal cannot be read from the port 63b. Thus, the first processing unit 63 passes the signal transmitted from the port 63b without reading it and outputs the signal from the port 63a. It is indicated by a dashed arrow.

Since the first processing unit 63 passes the signal transmitted from the port 63b without reading it as described above, it cannot read the signal processed by the second processing unit 64. Accordingly, the cascade connection output port 64b of the second processing unit 64 is connected to the input port 63c of the first processing unit 63, so that the first processing unit 63 can read the signal processed by the second processing unit 64. Thereby, the first processing unit 63 can use the signal processed by the mixing console 61 and the second processing unit 64. Further, "1+2+3" is displayed at the connection path that connects the output port 64b and the input port 63c to indicate that the signal processed by the mixing console 61, the first processing unit 63, and the second processing unit 64 is transmitted via the connection path. Moreover, an output unit which is an external device 18 can be connected to the cascade connection output port 63d of the first processing unit 63 and a speaker or the like can output an audio signal processed by the mixing console 61, the first processing unit 63, and the second processing unit 64 via the output unit.

Figure 7:
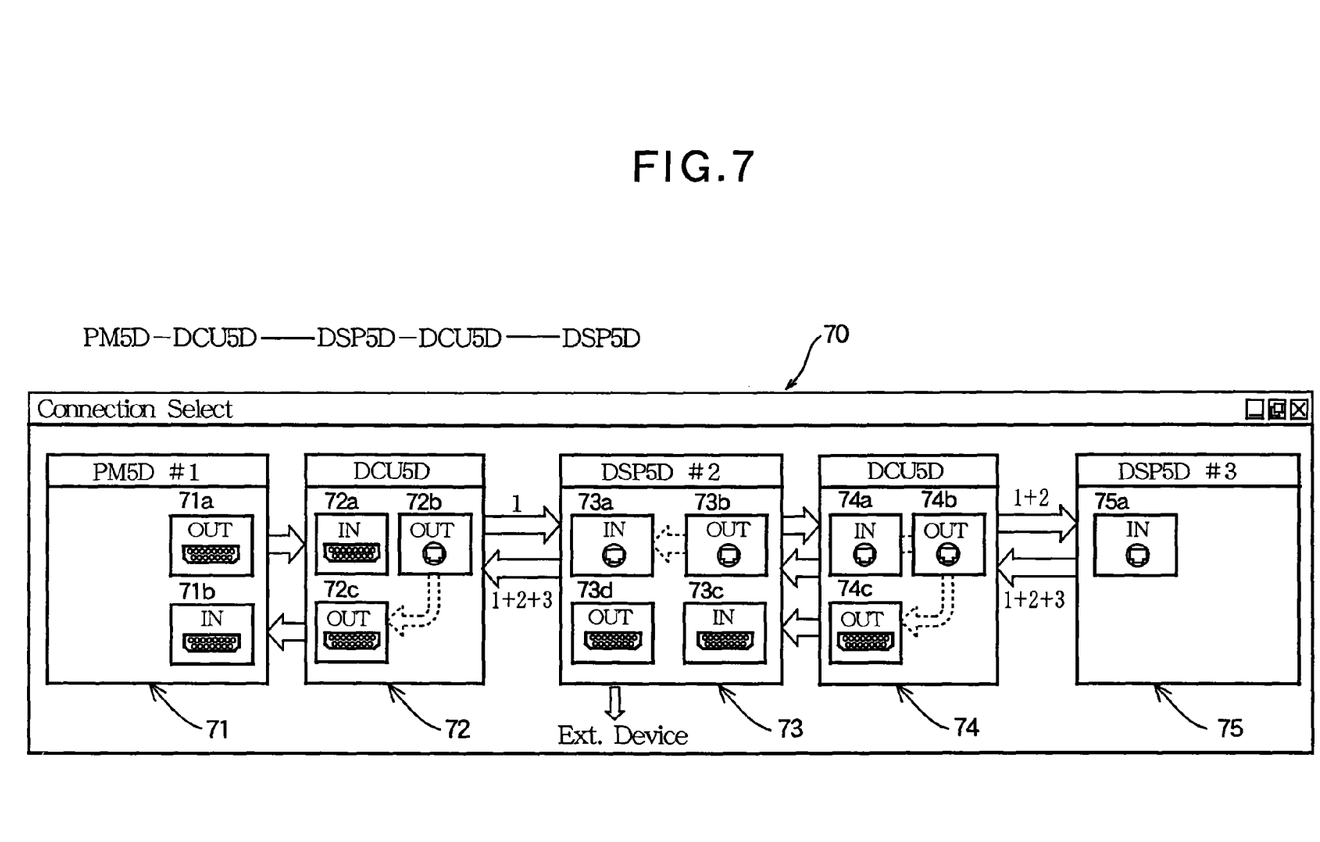
FIG. 7 is a diagram illustrating a connection diagram of a further selected connection template displayed on the display unit in the audio device according to the embodiment of the present invention.

Subsequently, FIG. 7 shows a connection diagram 70 which is displayed when the "PM5D-DCU5D-------DSP5D-DCU5D-------DSP5D" connection template is selected in the selection box 34 on the Connection Select screen and then the OK button 36 is pressed. In the selected connection template, the audio system is composed of a mixing console (PM5D), two cabling units (DCU5D), and two extended processing units (DSP5D) which perform the mixing process. In this case, the mixing console and the first cabling unit are connected in cascade connection, the first cabling unit and the first processing unit are connected via Ethernet with being located a long distance away from each other, the first processing unit and the second cabling unit are connected via Ethernet and in cascade connection, and the second cabling unit and the second processing unit are connected via Ethernet with being located a long distance away from each other.

The connection template shown in FIG. 70 has a configuration in which the second cabling unit is added to the configuration of the connection template shown in FIG. 60. This configuration will now be described below.

The Ethernet bidirectional port 73b of the first processing unit (DSP5D #2) 73 is connected to the Ethernet bidirectional port 74a of the second cabling unit (DCU5D) 74: "1+2," which is not shown, is displayed at the downward connection path to indicate that the signal processed by the mixing console (PM5D #1) 71 and the first processing unit 73 is transmitted via the connection path; and "1+2+3," which is not shown, is displayed at the upward connection path to indicate that the signal processed by the mixing console 71, the first processing unit 73, and the second processing unit (DSP5D #3) 75 is transmitted via the connection path. In this regard, however, up to 32 channels can be received (read) via Ethernet in a single device as described above, and therefore in the case where 32 channels are received at the port 73a of the first processing unit 73, the signal cannot be read from the port 73b. Thus, the first processing unit 73 passes the signal transmitted from the port 73b without reading it and outputs the signal from the port 73a. It is indicated by a dashed arrow.

Since the first processing unit 73 cannot read the signal processed by the second processing unit 75 as described above, the cascade connection output port 74c of the second cabling unit 74 is connected to the input port 73c of the first processing unit 73, so that the first processing unit 73 can read the signal processed by the second processing unit 75. Further, "1+2+3," which is not shown, is displayed at the connection path that connects the output port 74c and the input port 73c to indicate that the signal processed by the mixing console 71, the first processing unit 73, and the second processing unit 75 is transmitted via the connection path. Thereby, the first processing unit 73 can use the signal processed by the mixing console 71 and the second processing unit 75. Moreover, an output unit which is an external device 18 can be connected to the cascade connection output port 73d of the first processing unit 73 and a speaker or the like can output an audio signal processed by the mixing console 71, the first processing unit 73, and the second processing unit 75 via the output unit.

Furthermore, the Ethernet bidirectional port 74b of the second cabling unit 74 is connected to the Ethernet bidirectional port 75a of the second processing unit 75: "1+2" is displayed at the downward connection path that connects the ports to indicate that the signal processed by the mixing console 71 and the first processing unit 73 is transmitted via the connection path; and "1+2+3" is displayed at the upward connection path to indicate that the signal processed by the mixing console 71, the first processing unit 73, and the second processing unit 75 is transmitted via the connection path. Thereby, the second processing unit 75 can use the signal processed by the mixing console 71 and the second processing unit 73. The signal received at the Ethernet port 74b is converted to a cascade connection signal and output from the output port 74c in the second cabling unit 74. It is indicated by a dashed arrow. Furthermore, it is assumed that up to 32 channels can be received (read) via Ethernet also in the second cabling unit 74, and therefore in the case where 32 channels are received at the port 74a of the second cabling unit 74, the signal cannot be read from the port 74b. Thus, the second cabling unit 74 passes the signal transmitted from the port 74b without reading it and outputs the signal from the port 74a. It is indicated by dashed lines.

Since the connection mode among the mixing console (PM5D #1) 71, the first cabling unit (DCU5D) 72, and the first processing unit (DSP5D #2) 73 is the same as the connection mode shown in the connection diagram 60, the description thereof is omitted here.

The signal transmitted over the connection paths in the connection template described hereinabove is considered to be a control signal for controlling a frame of the mixed audio signal and the processing units from the mixing console. Furthermore, the connection template is not limited to the five types described above, and a user can create connection templates in advance and store them in storage means.

When installing the audio system, the user selects a connection template having the same configuration as the intended audio system. Thereafter, while the user connects the devices constituting the audio system, the connection mode of the connection template and the connection status between the actually connected devices are checked together: an unmatched connection area, if any, is shown accordingly on the connection diagram of the selected connection template displayed on the display 16. For example, in the case of a mismatch in the connection destination port, a mark "x" is displayed at the corresponding port or the port is displayed grayed out.

Note that the connection template is for use in presenting "the device connection status" and therefore the connection template does not need to include detailed settings of the devices such as, for example, the connection information on the slots into which the audio plug-in cards are inserted in the input units and the output units.

Figure 8:
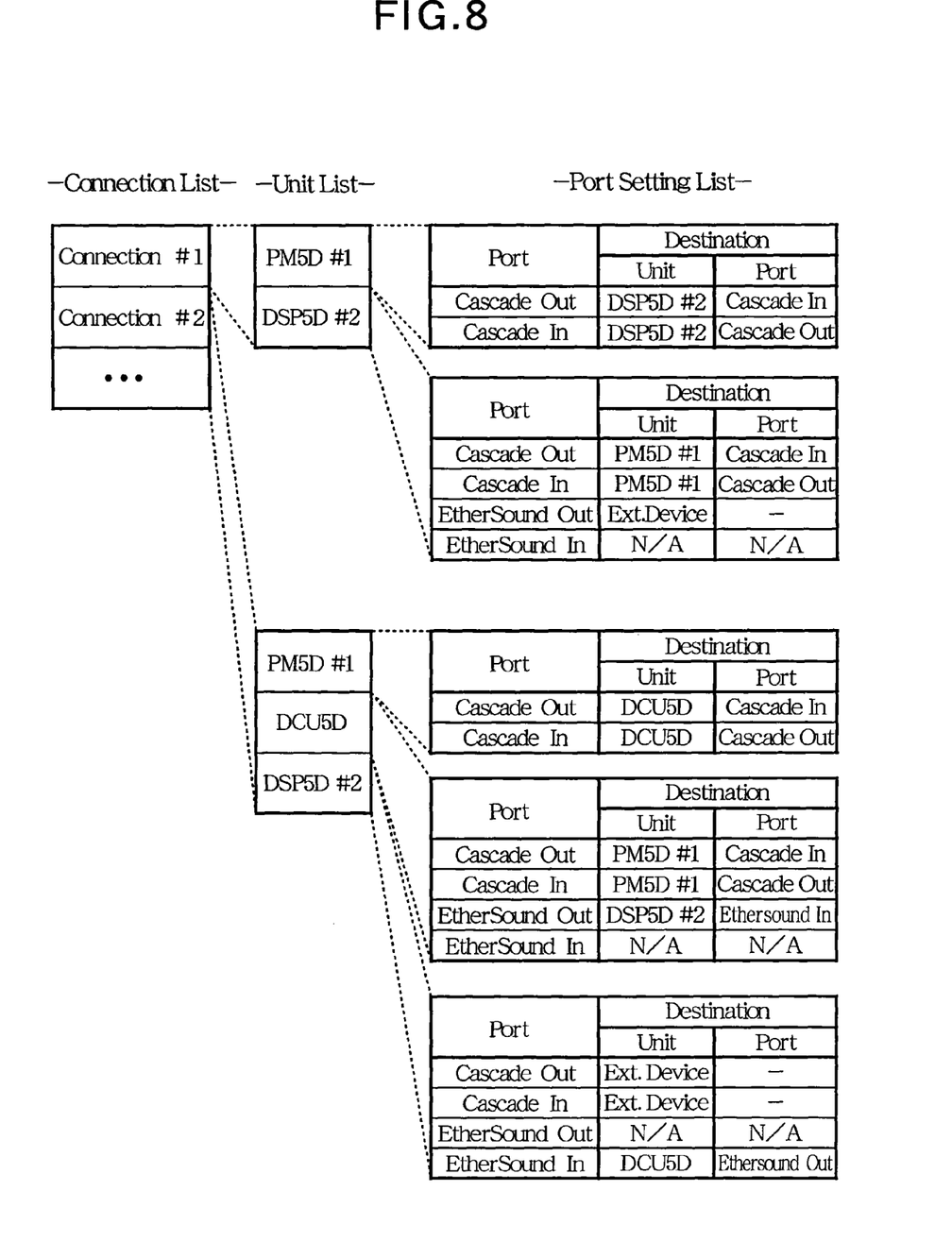
FIG. 8 is a diagram illustrating a data table of the connection template in the audio device according to the embodiment of the present invention.

Subsequently, FIG. 8 shows a data table of the connection template.

In FIG. 8, "Connection List" is a connection template list and, in the shown example, the list is made of the types of connection templates including "Connection #1," "Connection #2," and so on. A list which is one level lower than "Connection List," that is, "Unit List" is a list of device units used for each connection template. In the shown example, the mixing console "PM5D #1" and the processing unit "DSP5D #2" are used for the connection template "Connection #1," and the mixing console "PM5D #1," the cabling unit "DCU5D," and the processing unit "DSP5D #2" are used for the connection template "Connection #2." Moreover, a list which is one level lower than "Unit List," that is, "Port Setting List" is a list showing the connection settings of the ports of the units to be used.

In the shown example, the destination of the cascade connection output port (Cascade Out) of the mixing console "PM5D #1" of "Connection #1" is set to the cascade connection input port (Cascade In) of the processing unit "DSP5D #2," the destination of the cascade connection input port (Cascade In) of the mixing console "PM5D #1" is set to the cascade connection output port (Cascade Out) of the processing unit "DSP5D #2," the destination of the cascade connection output port (Cascade Out) of the processing unit "DSP5D #2" is set to the cascade connection input port (Cascade In) of the mixing console "PM5D #1," the destination of the cascade connection input port (Cascade In) of the processing unit "DSP5D #2" is set to the cascade connection output port (Cascade Out) of the mixing console "PM5D #1," the destination of the Ethernet output port (EtherSound Out) of the processing unit "DSP5D #2" is set to an external device (Ext. Device), and the Ethernet input port (EtherSound In) of the processing unit "DSP5D #2" is set to Not Applicable (N/A). From the above, it is apparent that the connection template "Connection #1" corresponds to the data table of the connection template of the connection diagram 40 shown in FIG. 4.

Moreover, the destinations of the ports of the mixing console "PM5D #1," the cabling unit "DCU5D," and the processing unit "DSP5D #2" of the connection template "Connection #2" are set as described below, respectively. In the mixing console "PM5D #1," the destination of the cascade connection output port (Cascade Out) is set to the cascade connection input port (Cascade In) of the cabling unit "DCU5D" and the destination of the cascade connection input port (Cascade In) of the mixing console "PM5D #1" is set to the cascade connection output port (Cascade Out) of the cabling unit "DCU5D." In the cabling unit "DCU5D," the destination of the cascade connection output port (Cascade Out) is set to the cascade connection input port (Cascade In) of the mixing console "PM5D #1," the destination of the cascade connection input port (Cascade In) of the cabling unit "DCU5D" is set to the cascade connection output port (Cascade Out) of the mixing console "PM5D #1," the destination of the Ethernet output port (EtherSound Out) of the cabling unit "DCU5D" is set to the Ethernet input port (EtherSound In) of the processing unit "DSP5D #2," and the Ethernet input port (EtherSound In) of the cabling unit "DCU5D" is set to Not Applicable (N/A).

In the processing unit "DSP5D #2," the destination of the cascade connection output port (Cascade Out) is set to an external device (Ext. Device), the destination of the cascade connection input port (Cascade In) of the processing unit "DSP5D #2" is set to an external device (Ext. Device), the Ethernet output port (EtherSound Out) of the processing unit "DSP5D #2" is set to Not Applicable (N/A), and the destination of the Ethernet input port (EtherSound In) of the processing unit "DSP5D #2" is set to the Ethernet output port (EtherSound Out) of the cabling unit "DCU5D." From the above, it is apparent that the connection template "Connection #2" corresponds to the data table of the connection template of the connection diagram 30 shown in FIG. 3.

The above data table of the connection template consists of the connection setting data on the ports each connecting the devices and the connection setting data on the ports of the output units and input units connected to the devices, and it does not include the connection setting data on the ports of the output units and input units and the connection setting data on the slots into which cards are inserted to be installed in these units. Thus, the output units and the input units are not targets of the connection check.

Figure 9:
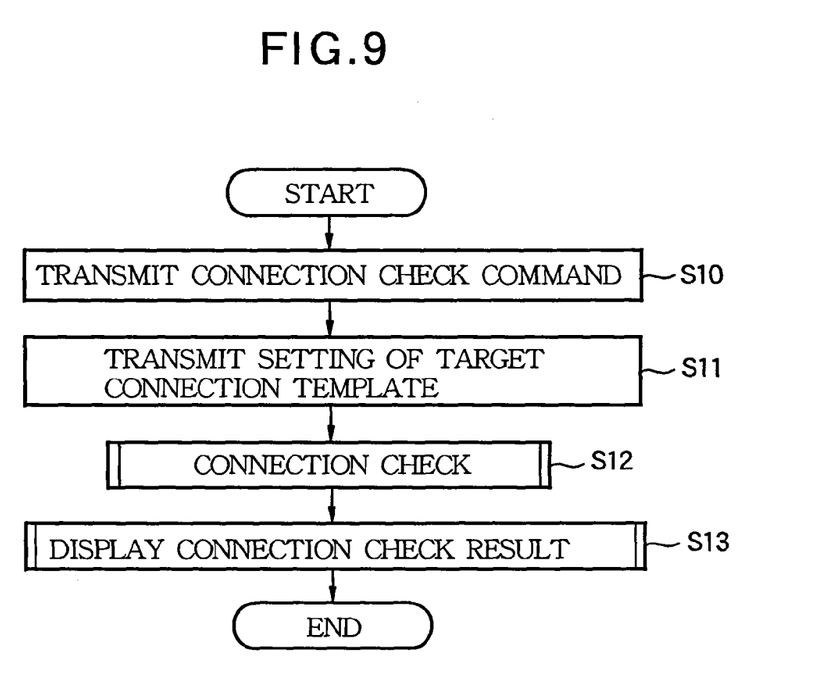
FIG. 9 is a flowchart of a connection check start process performed by the audio device according to the embodiment of the present invention.

Subsequently, FIG. 9 shows a flowchart of a connection check start process that the master performs in the audio system. The audio device 1, which controls the external device 18 by transmitting a control signal to the external device 18, is the master in the audio system shown in FIG. 1, and the mixing console (PM5D), which controls the mixing process of the processing unit (DSP5D), is the master in the audio system of the connection template described above.

When the user performs an operation to start the connection check, at the timing when the connection check is regularly started, or when the master device is turned on, the connection check start process is started and, in step S10, a connection check command is transmitted to device units connected to the master and the device units that received the check command perform a preparatory process for the connection check. Next in step S11, the connection setting data of the connection template selected on the Connection Select screen is transmitted to the unit devices connected to the master. Thereafter, a connection check process is performed in step S12 to compare the connection setting data received in each unit device with the connection status of each port in the unit device, and a connection check result display process is performed in step S13 to display a result of the connection check on the display 16. Then, the connection check start process ends.

Figure 10:
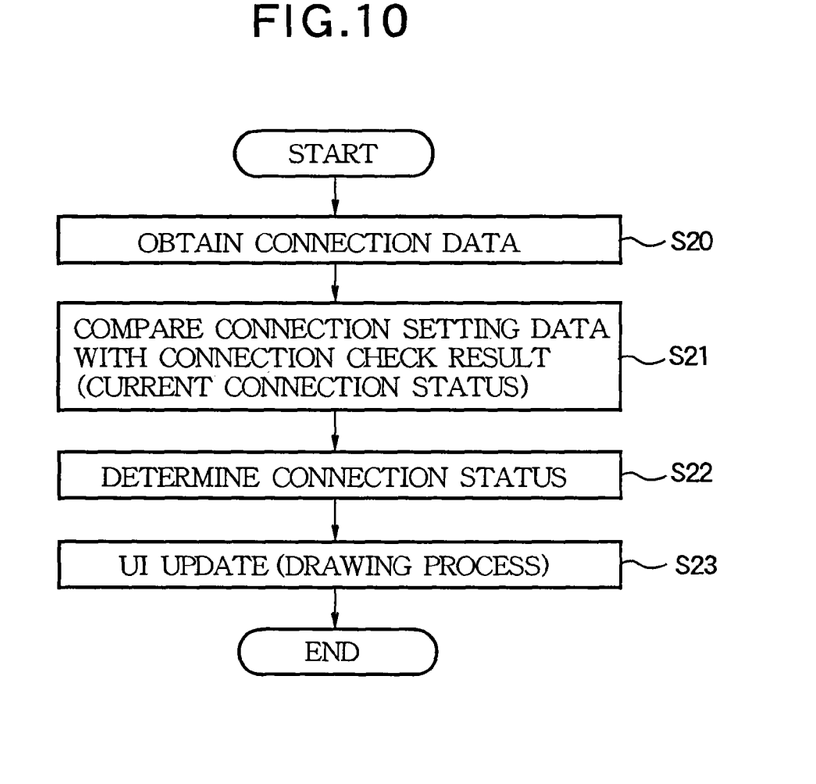
FIG. 10 is a flowchart of a connection check result display process performed by the audio device according to the embodiment of the present invention.

Subsequently, FIG. 10 shows a flowchart of the connection check result display process in step S13 for the connection check start process performed by the master.

The master starts the connection result display process when the connection check result is returned from a slave device such as the processing unit (DSP5D) or at the occurrence of a connection error, and then obtains connection data including the connection setting data of the connection template selected on the Connection Select screen and the connection check result in step S20. Subsequently, the obtained connection setting data is compared with the connection check result representing the current connection status in step S21. Then, the master determines the connected area where the error is set from a result of the comparison between the connection setting data and the connection result in step S22. Subsequently, in step S23, the master performs a user interface (UI) update process of performing a drawing process in which the connected area where the error is set is displayed as such on the connection diagram of the selected connection template displayed on the display 16, and then the connection result display process ends. In the UI update process, a mark "x" is displayed at the connected area where the error is set or the area is displayed grayed out. In this case, the same indication can be made at the destination port of the port concerned.

Figure 11:
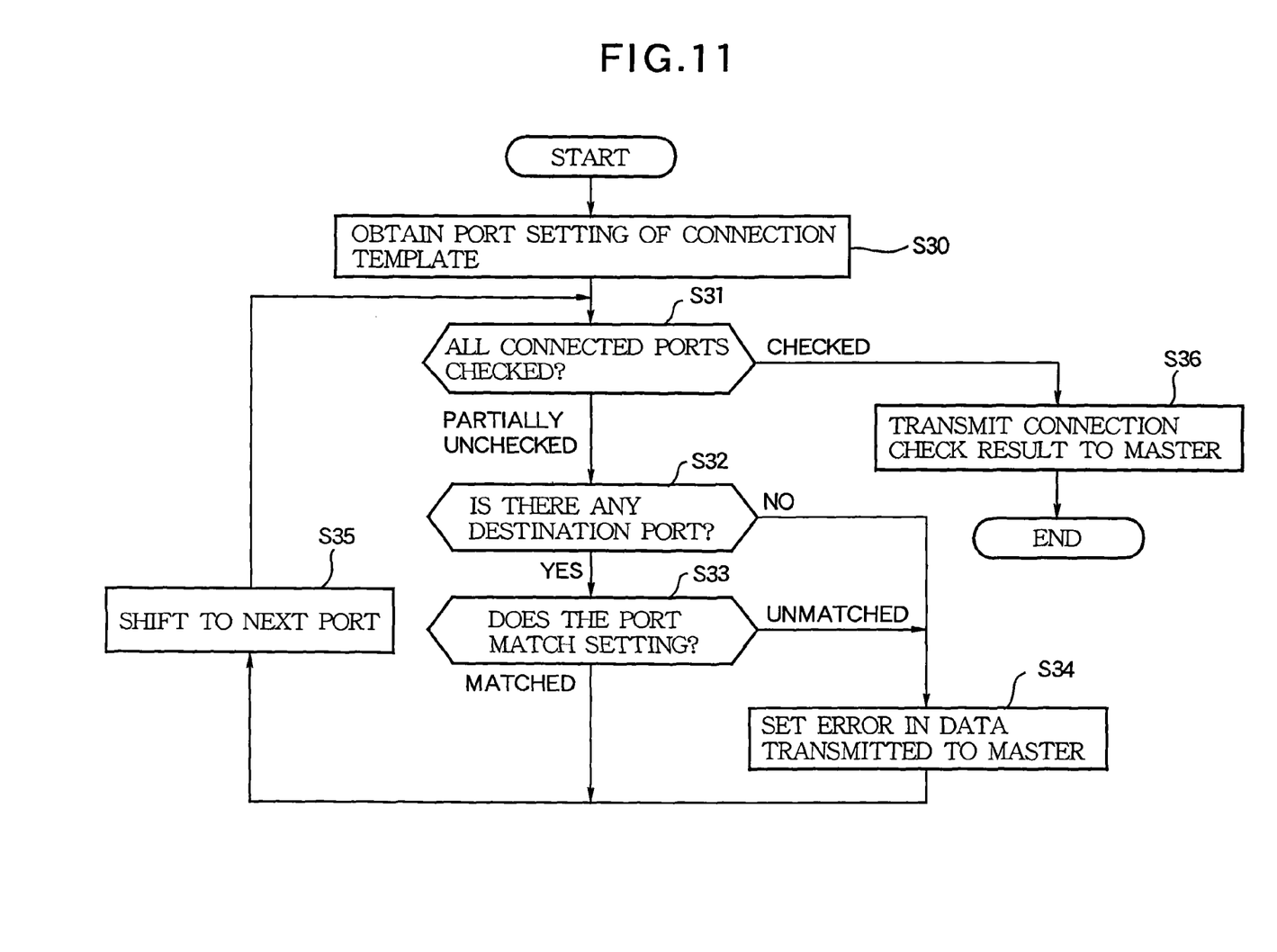
FIG. 11 is a flowchart of a connection check process performed by the audio system according to the present invention.

Subsequently, FIG. 11 shows a flowchart of the connection check process in step S12 in the connection check start process performed by each device.

Upon receiving a connection check command, each of the devices including the master starts the connection check process. Then, the connection setting data of the connection template transmitted in step S11 of the connection check start process is obtained in step S30. Subsequently, it is determined in step S31 whether the connection statuses of all connected ports have been checked. In this example, however, it is determined that there are unchecked ports because of the first round and the control proceeds to step S32. In step S32, it is determined whether there is a currently connected destination port by using an active sense or a port ID distinction among the connected unchecked ports. If it is determined that there is the destination port, the control proceeds to step S33, where it is determined whether the port determined to be the destination port matches the setting of the connection setting data with reference to the corresponding connection setting data in the data table of the connection template shown in FIG. 8. If it is determined that the port does not match the port based on the connection setting data at this point, the control branches to step S34 to set an error for data transmitted to the master and then proceeds to step S35. On the other hand, if it is determined that the port matches the port based on the connection setting data, the control proceeds to step S35. In step S35, a process of shifting the target to the next port is performed.

If it is determined that there is no destination port in step S32, the control branches to step S34 to set an error for the data transmitted to the master and then proceeds to step S35. Thereafter, after completion of the process of step S35, the control returns to step S31 and then processes of step S32 to step S35 are performed repeatedly for the ports, each of which is a subsequent check target and determined to be unchecked in step S31. Thereby, after completion of the connection check for all the ports determined to be unchecked in step S31, it is determined that the connection statuses of all the connected ports have been checked in step S31 and then the control branches to step S36. In step S36, the connection check result is transmitted to the master and the connection check process ends. If there is a port whose actual connection status is inconsistent with the connection setting data, the connection check result with the error set is provided.

Although the audio system is a mixing console in the present invention described hereinabove, the present invention is not limited thereto, but it is applicable to a versatile audio system that processes audio signals. Moreover, although the connection check is not performed for the ports of the output units and input units connected to the devices in the above description, alternatively the connection templates can include the connection setting data of the ports of the output units and input units, so that the connection check is performed for the ports of the output units and input units using the connection template. Note that, however, the connection check is not intended for the settings of the positions of the slots into which the cards to be installed in these units are inserted.

Furthermore, although up to 32 channels can be received (read) and transmitted (written) at the Ethernet port in the above, the present invention is not limited thereto, but up to 64 channels, 96 channels, or the like is applicable. Still further, although the connection template is previously generated by the manufacturer of the audio system and stored in the ROM, alternatively a user can generate a frequently used connection template and store it in storage means. In this case, since the connection template just indicates the connection status or topology of the devices and the user does not need to set the detailed settings of the devices in the connection template, the user can easily generate the connection template.

The invention claimed is:

1. An audio device that has a port for connection and that constitutes an audio system together with at least one external device having a port for connection with the audio device via different types of communication lines including one type of communication line and another type of communication line having a transmission distance longer than the one type of communication line, the audio device comprising:

a plurality of connection setting templates that are previously prepared and that contain target port connection information specifying target destination ports to which the ports of the audio device and the external device that constitute the audio system should be connected;

a selection part that selects one of the connection setting templates;

a display part that displays a list of the plurality of connection setting templates for selection, wherein each connection setting template contains communication lines connecting the audio device and the external device, and each communication line being indicated in such a manner so as to represent the type thereof, the display also displaying a connection diagram showing a connection topology of the audio device and the external device of the audio system constituted based on the connection setting template selected by the selection part, the connection diagram including images of the audio device and the external device in a form indicating a type of communication line adaptable to each of the audio device and the external device and identification information identifying the audio device and the external device, the connection diagram further including connection paths that connect the ports of the audio device and the external device to the target destination ports for transmission of audio data, each connection path accompanying identification information indicating one or more devices used to process the audio data transmitted via the respective connection path;

a check part that compares the target port connection information contained in the connection setting template selected by the selection part with actual port connection information indicating actual destination ports to which respective ports of the audio device and the external device constituting the audio system are actually connected; and an output part that outputs a result of comparison between the target port connection information and the actual port connection information by the check part.

2. The audio device according to claim 1, wherein the audio device and the external device have ports of different types corresponding to the different types of communication lines, and the display part indicates the ports of different types in the form of icons corresponding to the types of communication lines in the connection diagram.

3. The audio device according to claim 1, wherein the check part transmits the target port connection information to the external device, and receives a result of comparison performed by the external device between the actual port connection information indicating the actual destination ports to which the ports of the external device are actually connected and the received target port connection information.

4. The audio device according to claim 3, wherein in case that the received result of the comparison indicates an error at a point where the actual port connection information does not match the target port connection information, the output part controls the display part to indicate that there is a connection error in the connection diagram at the point where the error is indicated.

* * * * *